(No Model.) 2 Sheets—Sheet 1.
E. CROASDALE.
DYNAMO ELECTRIC MACHINE OR ELECTRIC MOTOR.
No. 428,380. Patented May 20, 1890.
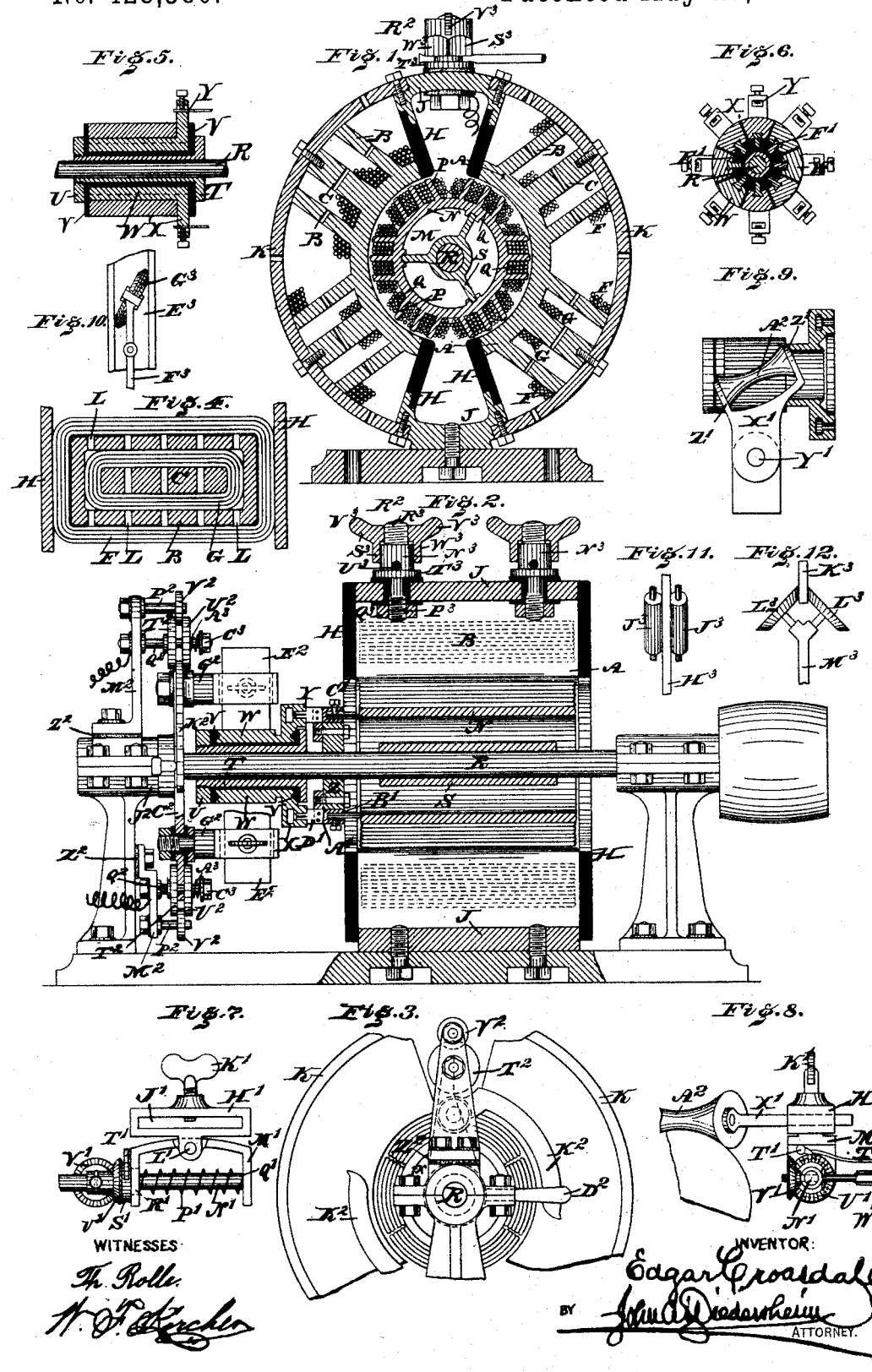
WITNESSES
Th. Rolle
W. F. Kircher
INVENTOR:
Edgar Croasdale
BY John A. Wiedersheim
ATTORNEY.

(No Model.) 2 Sheets—Sheet 2.
E. CROASDALE.
DYNAMO ELECTRIC MACHINE OR ELECTRIC MOTOR.
No. 428,380. Patented May 20, 1890.
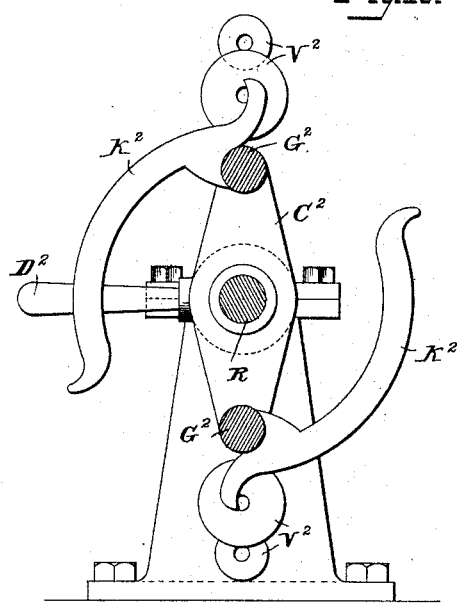
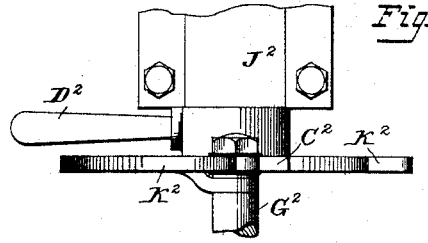

UNITED STATES PATENT OFFICE.

EDGAR CROASDALE, OF PHILADELPHIA, PENNSYLVANIA.

DYNAMO-ELECTRIC MACHINE OR ELECTRIC MOTOR.

SPECIFICATION forming part of Letters Patent No. 428,380, dated May 20, 1890.

Application filed January 26, 1886. Serial No. 189,822. (No model.)

*To all whom it may concern:*

Be it known that I, EDGAR CROASDALE, a citizen of the United States, residing at Philadelphia, in the county of Philadelphia and State of Pennsylvania, have invented a new and useful Improvement in Dynamo-Electric Machines or Electric Motors, of which the following is a specification.

My invention relates to improvements in dynamo-electric machines or motors of the self-exciting type; and it consists in features of construction hereinafter enumerated, but particularly pointed out in the claims which follow this specification. It will be better understood by referring to the accompanying drawings, taken in connection with the specification.

Figure 1 represents a transverse section taken through the machine in the plane of rotation of the armature. Fig. 2 is a vertical longitudinal sectional view of the entire machine, showing parts thereof in elevation. Fig. 3 is a broken end elevation showing the relation of the brush-shifting devices. Fig. 4 is a cross sectional view of one leg of one of the field-cores, showing the laminated structure thereof and the winding of the exciting-wire. Figs. 5 and 6 are detail sectional views of the commutator, taken, respectively, ninety degrees apart. Fig. 7 is a detail end elevation of the commutator-brush-holding device. Fig. 8 is a side elevation of the same with commutator. Fig. 9 is a detail view of a peculiar form of commutator-brush. Figs. 10, 11, and 12 are modified detail views of the contact mechanism connected with the brush-shifting devices. Figs. 13 and 14 are detail views of the brush and necessary connections.

Prior to my invention it was old in the art to construct a dynamo-machine with two opposite pole-pieces closely encircling a ring-armature of the Gramme type, said pole-pieces being of what is known as the "Camacho" type of magnet. It was also old to combine encircling field-magnet poles with a barrel-armature having radial pole-pieces, such as is known in the art as the "Lontin" type of armature. In my machine the field-magnets are composed of two magnetically distinct or separate pole-pieces which closely encircle the armature, each of which is made up of two or more inwardly-projecting legs magnetically connected at both ends and wound after the manner of the Camacho magnets, the construction being such that the field on one side of the rotating armature is all north, while that upon the opposite side is all south. The armature is of the Lontin type, having projecting pole-pieces which are wound after the manner of a Camacho magnet. The special details of construction concerning the commutator-brush and other attachments will be better understood in connection with a detail description of the entire apparatus had in connection with the drawings.

A A represent two approximately semicircular magnets which closely envelop the armature M. The outer portions K of these magnets, as well as the parts C, are magnetic, and are connected to the frame of the machine by a yoke.

H H are non-magnetic plates which are secured to the part J, but detachable from the cores C. H H also represent side plates, as shown in Fig. 2, for the protection of the machine. The winding of the field-magnets is the same as in the Camacho machine, and is so arranged as to make the interior pole of one magnet north, while that of the other is south. The winding of the circuit upon the armature is also like that of the Camacho magnet, and the wire thereof is connected to the commutator-strips in any desired way. This armature M consists of an iron or magnetic ring N, having projecting pole-pieces P, and is carried on the shaft R by a spider Q. The pole-pieces of the field-magnets B C are laminated, as shown at L in Fig. 4, for the purpose of ventilation and to avoid Foucault currents. The commutator is supported on a metallic sleeve T, keyed to the shaft R and provided with a nut U, which holds it in proper place. This commutator is insulated from metallic sleeve T by a rubber or vulcanized fiber spool V; and it consists of a series of commutator-strips W, firmly held in place by the action of the screw-nut U on sleeve T against the V-shaped insulated parts, as shown in Fig. 2. They are also held embedded in the insulating material constituting the sleeve V, as clearly shown in Fig. 6. At their inner ends they are turned, and are provided with eyes Q and screws X for holding the extensions of the armature-wire firmly in position on the same shaft. Abutting against the end of the armature is a vulcanized fiber or other insulating ring Z, provided with the necessary attachments, as shown in Fig. 2, for connecting a series of conducting-strips D' between the commutator-bars and the armature-wires. The armature-wires are brought to this ring Z and connected up in any well-known manner, as will be understood by those skilled in the art.

$E^2$ $E^2$ are the commutator-brushes, which rest upon the commutator-strips in the usual manner, and are firmly held in place by the brush-holders supported upon the arms $G^2$, which latter are insulated from the frame and connected to a brush-shifting yoke $C^2$, journaled on the shaft R. These brush-holders are composed of two yokes H' M', journaled on the arms $G^2$ and adapted to allow the brush to assume any desired position, said yokes being connected together, as shown at L', in such manner as to give universal motion.

J' is an opening into which the brush is fitted, and K' is a thumb-screw for holding it in place. P' is a spiral spring wound about the brush-holding rod N' and attached thereto at one of its ends, the other end being attached to the yoke M', which carries at its outer end a ratchet S' and pawl T', said ratchet being fixed to a bevel-gear U', which meshes with a corresponding bevel-gear V', provided with a handle W' for regulating the pressure of the brush on the commutator.

The brush-shifting yoke $C^2$ carries two quadrants $K^2$, of conducting material, which are insulated from the frame of the machine, but connected electrically to the brush-carrying arms $G^2$, which latter are also insulated from the yoke $C^2$. These quadrants are diametrically opposite each other and are adapted to revolve frictionally between two conducting-rollers $T^2$ $U^2$, journaled to the pins $Q^2$ and fixed to the frame, as shown, at the top and bottom of the machine. These pins $Q^2$ are of course insulated from the frame, as shown at $Z^2$. The contact-rollers $T^2$ and $U^2$ are held in place frictionally, grasping the quadrants by springs $A^3$, acted on by nuts $C^3$ on the ends of the pins $Q^2$. They are also held from lateral motion due to the action of the quadrants by additional rollers $V^2$, journaled on pins $P^2$, attached to the same arms which support the pins $Q^2$. It will be understood that with this arrangement the brushes may be shifted to any desired position, while the conductors which carry the current from the machine to the exterior circuit are not disturbed, the contacts from the brushes being made through the quadrants and rollers to fixed binding-posts on the machine.

The shifting of the commutator-brushes is effected by the agency of a hand-lever $D^2$, which is attached to the yoke $C^2$, carrying quadrants $K^2$, as shown in Figs. 2 and 3. With such an arrangement it will be seen that the armature-circuit may be absolutely broken by shifting the brushes to the proper position, as seen in Fig. 3. I regard this as an essential and valuable feature in my invention.

Figs. 10, 11, and 12 disclose modified forms of contact devices to supplant those used with the quadrants $K^2$. In Fig. 10 the part $E^3$ assumes the place of one of the quadrants $K^2$, while the bevel-roller $G^3$ makes contact to the outgoing circuits. Similarly in Fig. 11 the part $H^3$ corresponds to one of the quadrants, while the oblong rollers $J^3$ constitute the contacts to outgoing circuits. In Fig. 12 $K^3$ corresponds to one of the quadrants, while the bevel-rollers $L^3$, attached to the arm $M^3$, make a contact for the outgoing circuits.

In Fig. 9 I disclose a novel form of commutator-brush, which consists of an oblong roller having a curvilinear surface. This roller is journaled in the yoke Z', pivoted to the brush-holder at Y'.

Attached to the upper part of the machine and insulated therefrom I have shown two binding-posts $N^3$, firmly held in place by nuts $Q^3$ on the projecting ends $P^2$. These binding-posts have shoulders $T^3$ and the necessary holes $U^3$ for the insertion of the wire. On the upper end of said posts are thumb-nuts $V^3$, screw-threaded thereto, as shown at $R^3$, and having shoulder $S^3$, adapted to clamp the wire when inserted in the hole $U^3$ between it and the fixed shoulder $T^3$. This form of binding-post is not novel with me; but I prefer to use it, for the reason that it gives a firm contact, which is especially desirable in dynamo-machines. The conductors which energize the field-magnets pass from these posts either to the commutator-brushes or their necessary connections in a manner well understood, or else to a separate source of electrical energy for exciting said field-magnets.

Having thus described my invention, what I claim, and desire to secure by Letters Patent of the United States, is—

1. In a dynamo-electric machine or electric motor, the combination of two curved pole-pieces of magnetic material having each one or more outwardly-projecting cores, each of which is made of magnetic material and of two concentric parts, the exciting-wire being wound first on the exterior of one of said parts and then between the two in such direction as to concentrate the magnetic lines of force at the interior poles of said core, substantially as described.

2. In a dynamo-electric machine or electric motor, the curved pole-pieces A, having non-magnetic side and end plates H, in combination with the helices F and G, surrounding the concentric cores B and C, substantially as described.

3. In a dynamo-electric machine or electric motor, the curved pole-pieces A, having non-magnetic side and end plates H, and radial magnetic cores C, provided with surrounding helices, in combination with surrounding or concentric cores B and their surrounding helices, substantially as described.

4. In a dynamo-electric machine or electric motor, a curved pole-piece having a central magnetic core surrounded by a helix and a surrounding core surrounded by an additional helix, in combination with a surrounding shell or cap, said core and cap having slots or perforations, substantially as described.

5. In a dynamo-electric machine, the brush-shifting yoke $C^2$, having handles and mounted on the shaft R, the bearings $J^2$, brushes in holders insulated from said brush-arms, the curved pieces $K^2$, and the arms $M^2$, electrically insulated from the side bearings $J^2$ and carrying studs with wheels thereon, combined substantially as described.

6. A dynamo-electric machine or electric motor having a field-magnet composed of two parts, each of which has two or more inwardly-projecting pole-pieces with concentric cores magnetically united at their inner and outer ends and concentrically wound, substantially as described.

7. In a dynamo-electric machine, an armature consisting of a ring of magnetic material having pole-pieces, each consisting of concentric parts wound with concentric coils and united at their bases, said parts being combined substantially as described.

8. A commutator for a dynamo-electric machine or electric motor, consisting of a disk of insulating material, on which are secured contact-strips having means for connecting the armature-wire thereto permanently, and additional contact-strips for connecting said means with the commutator-strips, so that the commutator-strips may be removed for renewal or repairs without disturbing the wire-connections of the armature, substantially as described.

9. In a dynamo-electric machine or electric motor, a pivoted brush-carrying frame, in combination with a concave roller journaled thereon and a commutator, substantially as described.

10. In a dynamo-electric machine or electric motor, a commutator-brush-carrying device consisting of two pivotally-supported yokes adapted to cause the brush to bear evenly upon all portions of the commutator, substantially as described.

11. In a dynamo-electric machine or electric motor, a brush-supporting device consisting of a yoke or frame supported on a fixed arm and adapted to revolve about said fixed arm, with an additional yoke pivoted to the first-named yoke, substantially at right angles to the plane of rotation, whereby the brush is adapted to suit itself evenly to all portions of the commutator, substantially as described.

12. In a dynamo-electric machine or electric motor, a brush-supporting yoke consisting of two pivotal portions in combination with an adjusting pawl and ratchet for regulating the pressure of the brush on the commutator, substantially as described.

13. In a dynamo-electric machine, the conducting-rollers $T^2$ and $U^2$ on the same shaft, in combination with the quadrants $K^2$ on the shifting-yoke $C^2$, and means, substantially as described, for keeping the said conducting-rollers in contact with said quadrants, substantially as described.

14. In a dynamo-electric machine, a sliding rolling and shearing contact consisting of a rotary wheel, pivotal support therefor, and a a commutator, said parts being combined substantially as described.

EDGAR CROASDALE.

Witnesses:
JOHN A. WIEDERSHEIM,
A. P. GRANT.